Nov. 11, 1958 I. HOROWITZ 2,860,283
ELECTRONIC PROTECTIVE SYSTEM
Filed March 7, 1956
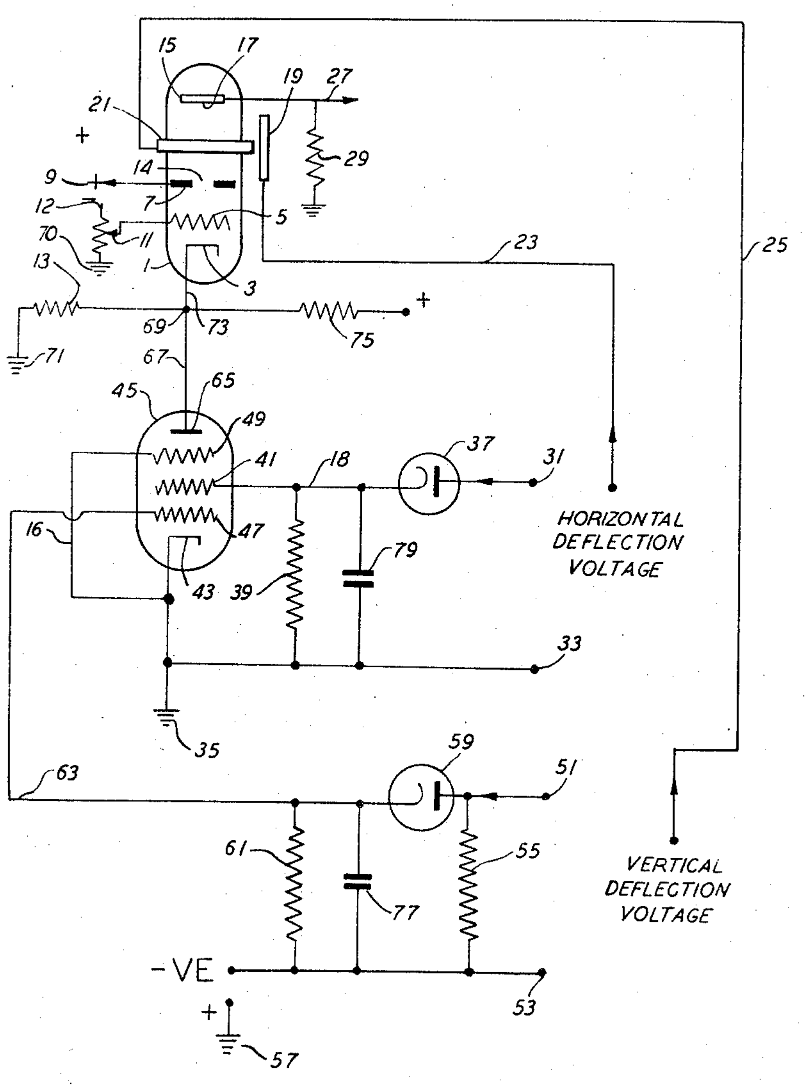
INVENTOR.
IRVING HOROWITZ
BY Rines and Rines
ATTORNEYS United States Patent Office 2,860,283

Patented Nov. 11, 1958

2,860,283

ELECTRONIC PROTECTIVE SYSTEM

Irving Horowitz, Eatontown, N. J., assignor, by mesne assignments, of one-half to Isaac S. Blonder and one-half to Ben H. Tongue Application March 7, 1956, Serial No. 570,021

11 Claims. (Cl. 315—20)

The present invention relates to electronic protective systems and, more particularly, to systems that prevent the destruction of electronic apparatus of the cathode-ray type.

Various proposals have been suggested for protecting the mosaic of cathode-ray light-sensitive pick-up tubes, such as television cameras and the like, and the fluorescent screens of cathode-ray display tubes, such as those used in oscillography and in television receiving and monitoring systems. In such electronic tubes, an electron stream is directed toward the mosaic or fluorecsent screen and the electron stream is caused periodically to scan across the screen so that it may trace out a predetermined scanning pattern. In television and similar applications, this scanning pattern assumes the form of successive horizontal scans, each vertically displaced one below the other to complete a vertical frame of horizontal scans. Such two-dimensional scanning is effected under the control of horizontal and vertical deflecting means. Loss of the deflection voltages to be supplied to the horizontal and vertical deflection means, or failure in the deflection means themselves, would result in the repetitive impingement of the electron stream upon the same single spot or line of the mosaic or fluorescent screen, thereby burning or otherwise damaging the mosaic or fluorescent screen.

In order to prevent this occurrence, it is necessary that the electron-stream current be reduced or cut off in the event of failure of the horizontal or vertical deflection voltages, or both. It has accordingly been proposed to feed components of the horizontal and vertical deflection voltages to a gating tube. An electro-mechanical relay or switch has been disposed in the output circuit of the gating tube to disconnect the electron gun of the cathode-ray device from one of its sources of bias or operating potential in the event that the gating tube is rendered inoperative upon loss of either the horizontal or vertical deflection voltages, or both. While such devices have been found in many cases to work satisfactorily, they are subject to the principal disadvantage that the relay is an electro-mechanical device, subject to the inherent unreliable properties of such devices. The relay contacts may, for example, become pitted, they may stick together, or other electrical or mechanical defects may arise. In addition, circuits of the above-described character are expensive since they involve utilizing the relay to switch very high electron-gun operating or bias voltages and require high-voltage rating precautions. The switching of such high voltages, moreover, further limits the period of fault-free operation of the relay and requires the utilization of specially designed relays.

An object of the present invention, therefore, is to provide a new and improved electronic protective system that shall not be subject to the above-described disadvantages and that, to the contrary, shall be direct-acting without the necessity for the utilization of an electro-mechanical relay or other switching device.

A further object is to provide such a protective system that shall be relatively inexpensive to manufacture and that shall embody only a minimum number of standard electronic components for its operation.

Other and further objects will be explained hereinafter and will be more particularly pointed out in the appended claims.

The invention will now be described in connection with the accompanying drawing, the single figure of which is a schematic circuit diagram illustrating the invention in preferred form.

An electronic cathode-ray apparatus of the electron-beam or electron-stream-producing type is shown at 1, provided with an electron gun comprising an electron-emitting cathode electrode 3, a control-grid electrode 5, and an accelerating apertured anode electrode 7. The anode electrode 7, the control-grid electrode 5 and the cathode electrode 3 are provided with operating and bias voltages for the electron gun. The anode electrode 7 is connected to a source of positive potential 9 and the control-grid electrode 5 is connected at 11 to an intermediate point of a bleeder resistor 12 the upper terminal of which is connected to a negative terminal —, and the lower terminal of which is grounded at 70. The cathode 3 is connected through a resistor 13 to the ground terminal 71. The cathode 3, in response to operating voltages, is caused to emit electrons which are accelerated past the control-grid electrode 5 through the aperture 14 in the accelerating anode 7, finally to impinge upon a screen 15. The screen 15 is illustrated in the form of a conductive television-camera mosaic screen containing a light-sensitive mosaic 17 upon which any desired light image that is to be televised, may be projected. The electron stream is caused to scan the mosaic 17 along orthogonal horizontal and vertical directions by conventional horizontal deflecting means 19, and vertical deflecting means 21, fed, respectively, by conductors 23 and 25 with horizontal and vertical deflection voltages, as is well known. The deflection means 19 and 21 may be electromagnetic or electrostatic deflection means, as desired, and the cathode-ray apparatus 1 may be provided with further electrodes, including focusing anodes, not shown for purposes of simplicity. In the event that the cathode-ray apparatus 1 is a television camera or pick-up tube, as before described, having a light-sensitive mosaic 17 mounted upon the conductive screen 15, the signal resulting from the scanning of the electron stream upon the light-sensitive mosaic 17 may be developed across the load resistor 29 and extracted by a conductor 27.

While the present invention has thus far been described in connection with a television camera or pick-up tube 1, it is to be understood that the description and the use of the present invention are equally applicable to the case where the apparatus 1 constitutes a cathode-ray display apparatus having, for example, a transparent fluorescent viewing screen 15 comprising one or more phosphor layers, instead of the mosaic 17. In such event, of course, no output signal will be extracted, so that the elements 27 and 29 are not required, the viewer merely observing the fluorescence of the screen as the electron stream impinges thereupon.

In accordance with the present invention, a portion of the horizontal deflection voltage is applied to the terminals 31, 33, the latter of which may be grounded, as at 35. A rectified component of the horizontal deflection voltage is obtained by passing the same through, for example, a diode rectifier 37, which may be of the electron-tube, crystal or solid type. There will thus be developed across the resistor 39 a positive rectified component of the horizontal deflection voltage which may be applied by conductor 18, between, for example, the screen-grid electrode 41 and the cathode 43 of an electron tube 45, illustrated as of the pentode type. A portion of the vertical deflection voltage may similarly be applied to terminals 51 and 53 across the input resistor 55. The lower terminal of the resistor 55 is preferably connected to a negative source of bias voltage, labelled —VE, the positive terminal of which may be grounded, as at 57. A rectifier 59, which may be similar to the rectifier 37, is shown developing across a further resistor 61, a positive rectified component of the vertical deflection voltage. This component may be applied by conductor 63 to the control-grid electrode 47 of the electron tube 45. The input circuit to the tube 45 thus comprises both the connections 18 and 63 to the screen-grid electrode 41 and the control-grid electrode 47 of the tube 45. The resistor 61, and the similar resistor 39 associated with the horizontal deflection voltage rectifier 37, are shown by-passed by respective condensers 77 and 79. The suppressor electrode 49 of the electron tube 45 is connected to the cathode 43 by conductor 16.

In the above-described circuit, unless the vertical deflection voltage is received at the terminals 51, 53, and its positive rectified component is developed by the rectifier 59 and applied to the control-grid electrode 47 of the tube 45, the control-grid electrode 47 will be negatively biased, by the before-mentioned source —VE, with respect to the cathode 43, rendering the tube 45 ineffective to conduct. Assuming, however, that the rectified component of the vertical deflection voltage is applied to the portion of the input circuit of the tube 45 comprising the connection 63 to the control-grid electrode 47, the electron tube 45 will conduct and current will flow between its cathode 43 and plate 65. This current, however, will be controlled by the potential applied to the screen-grid electrode 41. Only if a positive rectified component of the horizontal deflection voltage is applied to the screen-grid electrode 41 by conductor 18, can an appreciable predetermined current flow through the electron tube 45 to the anode 65.

In order that such a predetermined current may flow through the electron tube 45, therefore, it is essential that both the rectified components of the horizontal and vertical deflection voltages be simultaneously applied to the input-circuit grids 47 and 41 of the tube 45. In that event, the flow of the predetermined current in the output circuit conductor 67, connected to the anode 65 of the tube 45, will develop a predetermined potential at the point 69 relative to the ground terminal 71. That potential will modify the normal potential of the cathode 3 of the cathode-ray apparatus 1, rendering the cathode 3 sufficiently negative with respect to the control-grid electrode 5 to permit the passage of an electron stream in the cathode-ray device 1 to the mosaic 17. Should a loss of either or both of the horizontal and vertical deflection voltages occur, or should there be a failure in the production of the rectified components thereof, or should the deflecting means 19 and 21 or the connections thereto become faulty, however, the value of the current flowing through the tube 45 will be markedly reduced from the said predetermined value—substantially to zero. This will result in a rise in potential at the point 69, as the tube 45 is rendered ineffective, thereby raising the potential of the cathode 3 relative to that of the control-grid electrode 5 of the cathode-ray apparatus 1. Such a rise in the potential of the cathode 3 will effect the limiting of, and preferably substantially the cutting-off of, the electron stream in the device 1, protecting the screen 15 from the burns or damage before-described. The connection of the output conductor 67 by a substantially direct electrical connection 73 to the cathode 3, moreover, provides a simple and highly effective protective arrangement for the cathode-ray device 1 that eliminates all necessity for electro-mechanical relays or switching devices.

In actual practice, however, the current may not be completely cut off in the tube 45 upon failure of either or both of the horizontal and vertical deflection voltages. It is preferable, accordingly, to apply to the connection point 69, through a resistor 75, a potential of positive polarity and of sufficient value that, upon the reduction of the current flow through the electron tube 45 below the previously mentioned predetermined value of current, a positive bias potential will be applied to the cathode 3, sufficient to modify or limit, and preferably to cut-off, the electron stream flow in the cathode-ray tube 1.

It is to be understood that, if desired, the protective control of the cathode-ray electron stream may be effected by rendering the control-grid electrode 5 negative with respect to the cathode 3, instead of rendering the cathode 3 positive with respect to the control-grid electrode 5. This may be accomplished through reversal of the operating conditions of the tube 45, such that the tube fails to conduct only in the absence of either the horizontal or vertical deflection voltages. Not only may the control of the cathode-ray device 1 be effected at other electrodes than the cathode 3, but other types of electron tubes besides the pentode 45 may also be utilized as protective controlling elements. In the case of tubes 45 that can provide reliable cut-off characteristics upon loss of one or both of the deflection voltages, the potential supplied through the resistor 75 may not be necessary.

Further modifications will occur to those skilled in the art and all such are considered to fall within the spirit and scope of the invention, as defined in the appended claims.

What is claimed is:

1. An electric system having, in combination, electronic apparatus provided with means for producing an electron stream and means for deflecting the electron stream, electron-tube means having input and output circuits, means for applying to the input circuit rectified components of one or more electron-stream deflection voltages to be applied to the deflecting means, the rectified components having such polarity as to permit a predetermined current to flow through the electron-tube means into the output circuit during the said application of the rectified components, and an electrical connection from the output circuit to the electron-stream-producing means for biasing the operation of the electron-stream-producing means in accordance with the potential developed in the output circuit of the electron-tube means.

2. An electric system having, in combination, electronic apparatus provided with means for producing an electron stream and means for deflecting the electron stream, electron-tube means having input and output circuits, means for applying to the input circuit rectified components of one or more electron-stream deflection voltages to be applied to the deflecting means, the rectified components having such polarity as to permit a predetermined current to flow through the electron-tube means into the output circuit during the said application of the rectified components, an electrical connection from the output circuit to the electron-stream-producing means for biasing the operation of the electron-stream-producing means in accordance with the potential developed in the output circuit of the electron-tube means, and means for applying to the said electrical connection a potential of proper sign and of value sufficient to modify the operation of the electron-stream-producing means only upon variation of the current flow through the electron-tube means from the said predetermined current.

3. An electric system having, in combination, electronic apparatus provided with means for producing an electron stream and means for deflecting the electron stream, electron-tube means having input and output circuits, means for applying to the input circuit rectified components of one or more electron-stream deflection voltages to be applied to the deflecting means, the rectified components having such polarity as to permit a predetermined current to flow through the electron-tube means into the output circuit during the said application of the rectified components, an electrical connection from the output circuit to the electron-stream-producing means for biasing the operation of the electron-stream-producing means in accordance with the potential developed in the output circuit of the electron-tube means, and means for applying to the said electrical connection a potential of proper sign and of value sufficient to limit the operation of the electron-stream-producing means only upon a reduction in the current flow through the electron-tube means below the said predetermined current.

4. An electric system having, in combination, electronic apparatus provided with means including an electron-emitting cathode electrode, an anode electrode and at least a control-grid electrode for producing an electron stream and means for deflecting the electron stream, electron-tube means having input and output circuits, means for applying to the input circuit rectified components of one or more electron-stream deflection voltages to be applied to the deflecting means, the rectified components having such polarity as to permit a predetermined current to flow through the electron-tube means into the output circuit during the said application of the rectified components, and an electrical connection from the output circuit to one of the electron-stream-producing-means electrodes for biasing the operation of the electron-stream-producing means in accordance with the potential developed in the output circuit of the electron-tube means.

5. An electric system having, in combination, electronic apparatus provided with means including an electron-emitting cathode electrode, an anode electrode and at least a control-grid electrode for producing an electron stream and means for deflecting the electron stream, electron-tube means having input and output circuits, means for applying to the input circuit rectified components of one or more electron-stream deflection voltages to be applied to the deflecting means, the rectified components having such polarity as to permit a predetermined current to flow through the electron-tube means into the output circuit during the said application of the rectified components, an electrical connection from the output circuit to one of the electron-stream-producing-means electrodes for biasing the operation of the electron-stream-producing means in accordance with the potential developed in the output circuit of the electron-tube means, and means for applying to the said electrical connection a potential of proper sign and of value sufficient to modify the operation of the electron-stream-producing means only upon variation of the current flow through the electron-tube means from the said predetermined current.

6. An electric system having, in combination, electronic apparatus provided with means including an electron-emitting cathode electrode, an anode electrode and at least a control-grid electrode for producing an electron stream and means for deflecting the electron stream, electron-tube means having input and output circuits, means for applying to the input circuit rectified components of one or more electron-stream deflection voltages to be applied to the deflecting means, the rectified components having such polarity as to permit a predetermined current to flow through the electron-tube means into the output circuit during the said application of the rectified components, an electrical connection from the output circuit to one of the electron-stream-producing-means electrodes for biasing the operation of the electron-stream-producing means in accordance with the potential developed in the output circuit of the electron-tube means, and means for applying to the said electrical connection a potential of proper sign and of value sufficient to limit the operation of the electron-stream-producing means only upon a reduction in the current flow through the electron-tube means below the said predetermined current.

7. An electric system having, in combination, electronic apparatus provided with means for producing an electron stream and means for deflecting the electron stream along a pair of directions, electron-tube means having input and output circuits, means for applying to the input circuit rectified components of a pair of electron-stream deflection voltages to be applied to the pair of deflecting means, the rectified components having such polarity as to permit a predetermined current to flow through the electron-tube means into the output circuit during the said application of the rectified components, and an electrical connection from the output circuit to the electron-stream-producing means for biasing the operation of the electron-stream-producing means in accordance with the potential developed in the output circuit of the electron-tube means.

8. An electric system having, in combination, electronic apparatus provided with means for producing an electron stream and means for deflecting the electron stream along a pair of directions, electron-tube means having input and output circuits, means for applying to the input circuit rectified components of a pair of electron-stream deflection voltages to be applied to the pair of deflecting means, the rectified components having such polarity as to permit a predetermined current to flow through the electron-tube means into the output circuit during the said application of the rectified components, an electrical connection from the output circuit to the electron-stream-producing means for biasing the operation of the electron-stream-producing means in accordance with the potential developed in the output circuit of the electron-tube means, and means for applying to the said electrical connection a potential of proper sign and of value sufficient to limit the operation of the electron-stream-producing means only upon a reduction in the current flow through the electron-tube means below the said predetermined current.

9. An electric system having, in combination, a television pick-up tube provided with means including an electron-emitting cathode electrode, an anode electrode and at least a control-grid electrode for producing an electron stream and means for deflecting the electron stream along a pair of substantially orthogonal directions, electron-tube means having a plurality of electrodes including a plate, an input circuit connected with electrodes other than the plate, an output circuit connected with the plate, means for applying to the input circuit rectified components of a pair of electron-stream deflection voltages to be applied to the pair of deflecting means, the rectified components having such polarity as to permit a predetermined current to flow through the electron tube means into the output circuit during the said application of the rectified components, and an electrical connection from the output circuit to one of the electron-stream-producing-means electrodes for biasing the operation of the electron-stream-producing means in accordance with the potential developed in the output circuit of the electron-tube means, the said potential developed during the flow of the predetermined current permitting the production of the electron stream.

10. An electric system having, in combination, a television pick-up tube provided with means including an electron-emitting cathode electrode, an anode electrode and at least a control-grid electrode for producing an electron stream and means for deflecting the electron stream along a pair of substantially orthogonal directions, electron-tube means having a plurality of electrodes including a plate, an input circuit connected with electrodes other than the plate, an output circuit connected with the plate, means for applying to the input circuit rectified components of a pair of electron-stream deflection voltages to be applied to the pair of deflecting means, the rectified components having such polarity as to permit a predetermined current to flow through the electron-tube means into the output circuit during the said application of the rectified components, an electrical connection from the output circuit to one of the electron-stream-producing-means electrodes for biasing the operation of the electron-stream-producing means in accordance with the potential developed in the output circuit of the electron-tube means, the said potential developed during the flow of the predetermined current permitting the production of the electron stream, and means for applying to the said electrical connection a potential of proper sign and of value sufficient to bias substantially to cut-off the electron-stream-producing means only upon a reduction in the current flow through the electron-tube means substantially below the said predetermined current.

11. An electric system as claimed in claim 10 and in which the said one electrode of the electron-stream-producing means is the cathode electrode and the said electrical connection comprises a substantially direct connection between the said plate of the electron-tube means and the cathode electrode of the pick-up tube.

References Cited in the file of this patent

UNITED STATES PATENTS

| | | |
|---|---|---|
| 2,222,426 | White | Nov. 19, 1940 |
| 2,261,776 | Poch | Nov. 4, 1941 |
| 2,584,932 | Snyder | Feb. 5, 1952 |
| 2,617,964 | Blayney | Nov. 11, 1952 |